1,960,651

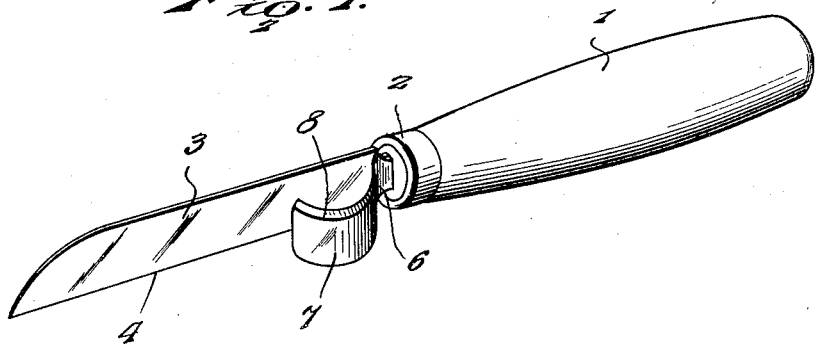
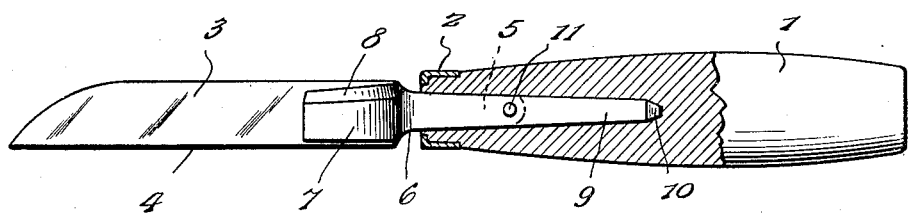
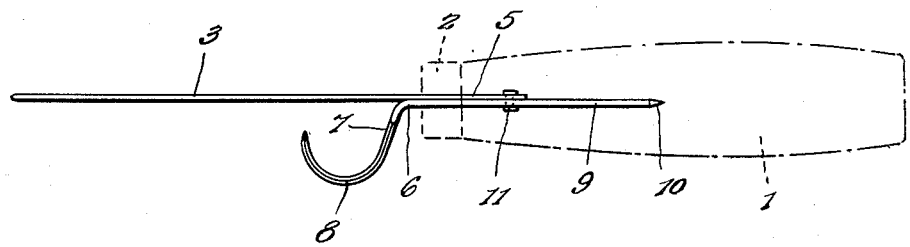
Inventor
George A. Swazey.
By Lacey & Lacey, Attorneys Patented May 29, 1934

UNITED STATES PATENT OFFICE 1,960,651

KNIFE AND CORER

George A. Swazey, Milo, Maine

Application February 4, 1932, Serial No. 590,929

1 Claim. (Cl. 146—204)

This invention relates to an improved knife and corer.

One object of the invention is to provide a device of this character having an auxiliary blade which may be utilized for removing the cores from apples, eyes from potatoes, and other analogous purposes.

Another object of the invention is to provide a knife and corer wherein the shank of the knife is attached to the extended shank of the corer so that a firm anchor within the handle for both of the shanks will be provided.

A further object of the invention is to provide a knife and corer which will be characterized by the utmost simplicity and which will be cheap to manufacture.

Still further objects will be apparent as the description of the invention proceeds.

In the drawing,

Figure 1 is a perspective view of the device,

Fig. 2 is a side elevation of the device partly shown in section, and

Fig. 3 is a top plan view of the blade and corer.

Referring now more particularly to the drawing, the numeral 1 indicates a preferably cylindrical handle which is formed of wood, hard rubber, or other suitable material. Carried on the forward end of the handle is a metal collar or ferrule 2.

Associated with the handle 1 is a blade 3 which is formed with a cutting edge 4 and is reduced at one end to form a relatively short shank 5 which is normally embedded within the handle. As will be observed, the shank 5 is slightly tapered in width toward its free end.

Carried by the blade 3, and associated with the shank 5 of said blade 3, is a corer 6 which comprises a blade 7 which is bent outwardly and bowed toward the blade 3, and, as best seen in Fig. 3 of the drawing, the free end of the blade 7 terminates in close spaced relation to the blade 3, at right angles thereto. The curved blade 7 is provided with a cutting edge 8 which is presented in an opposite direction to the cutting edge 4 of the blade 3. As best seen in Figs. 2 and 3 of the drawing, the corer 6 is provided with a relatively long shank 9 which projects into the handle, in overlying relation to the shank 5, and terminates at a point substantially intermediate of its length. The shank 9, of course, projects past the shank 5 of the blade 3. The shank is tapered in width toward its free end and is provided at said free end with a wedge shaped point 10 to facilitate driving of the shank into position. Extending through the shank 9, at a point substantially intermediate its length and connecting the shank 9 with the shank 5 of the blade 3, is a rivet 11. It will be observed that the rivet 11 is normally enclosed within the handle 1 and, as this is true, the shanks 5 and 9 will be firmly anchored to each other and will provide each other with reinforcement.

Attention is directed to the fact that, as the shank 9 is relatively long, and as the two shanks are connected together, said shank 9 will cooperate with the shank 5 for limiting both the corer 6 and the blade 3 against displacement.

In use, the blade 5 is engaged with an apple, potato, or pineapple, which it is desired to slice. After the slicing operation, the user of the device only has to roll the device towards him which will engage the cutting edge 8 of the blade 7 of the corer 6 with an eye of a potato, or core of an apple, or the like, and will remove said eyes or cores with a minimum amount of difficulty and without causing unnecessary mutilation of the apple or potato. It is to be understood that the device may be used for any purpose wherein it is desired to remove bruises from fruits or from vegetables.

It will be seen that I have provided a device which is characterized by the utmost simplicity and which may be used with a minimum amount of effort. It is also pointed out that the device can be manufactured on a large scale at a very small cost per device.

Having thus described my invention, I claim,

A device of the class described comprising a handle, a knife blade extending longitudinally from the handle and provided with a cutting edge, and a concavo convex corer arranged on one side of the blade adjacent the handle and provided with a cutting edge disposed opposite the cutting edge of the knife blade, the bight of the corer being spaced from one side of the blade and the upper and lower edges of the corer arranged entirely within the lines of the upper and lower longitudinal edges of the knife blade.

GEORGE A. SWAZEY. [L. S.]